United States Patent [19]

Shearer, Sr. et al.

[11] 4,069,956
[45] Jan. 24, 1978

[54] BALL CARRIER ADAPTED TO BE MOUNTED ON A BICYCLE

[76] Inventors: David Shearer, Sr., 131 Maplehurst Blvd.; David Shearer, Jr., 30 Eaton St., both of Battle Creek, Mich. 49017

[21] Appl. No.: 715,415

[22] Filed: Aug. 18, 1976

Related U.S. Application Data

[63] Continuation-in-part of Ser. No. 597,315, July 21, 1975.

[51] Int. Cl.² .............................................. B62J 11/00
[52] U.S. Cl. .................................. 224/37; 224/32 R; 248/302; 224/5 D
[58] Field of Search ................ 224/5 D, 45 L, 35, 36, 224/37, 39, 41, 32 R, 30 R, 30 A; 211/14, 15; 248/316 D, 316 R, 302, 311.1, 311.3; 240/138

[56] References Cited

U.S. PATENT DOCUMENTS

| 1,222,458 | 4/1917 | Peterson | 248/316 D |
| 2,074,180 | 3/1937 | Hatley | 224/5 D |
| 2,689,909 | 9/1954 | Dazley | 248/302 X |
| 2,741,813 | 4/1956 | Rubin | 248/311.1 X |
| 2,933,277 | 4/1960 | Messier | 248/316 D X |
| 4,009,810 | 3/1977 | Shook | 248/311.1 X |

FOREIGN PATENT DOCUMENTS 746,492   3/1933   France ........................... 224/45 L

*Primary Examiner*—Albert J. Makay
*Attorney, Agent, or Firm*—Samuel Kurlandsky

[57] ABSTRACT

A carrier for a ball such as a baseball adapted to be mounted on a bicycle, the carrier being formed of a single integral piece of wire generally in the form of a Figure - 8, having a large lower loop converging to a constriction, and then diverging and terminating in a smaller upper loop. The carrier is bent to correspond to the spherical surface of the ball, with the smaller loop clamping the ball against the larger loop and maintaining the ball in place. An integral pair of eyes are provided at the ends of the larger loop for mounting on an object such as a bicycle.

5 Claims, 5 Drawing Figures

U.S. Patent Jan. 24, 1978 4,069,956
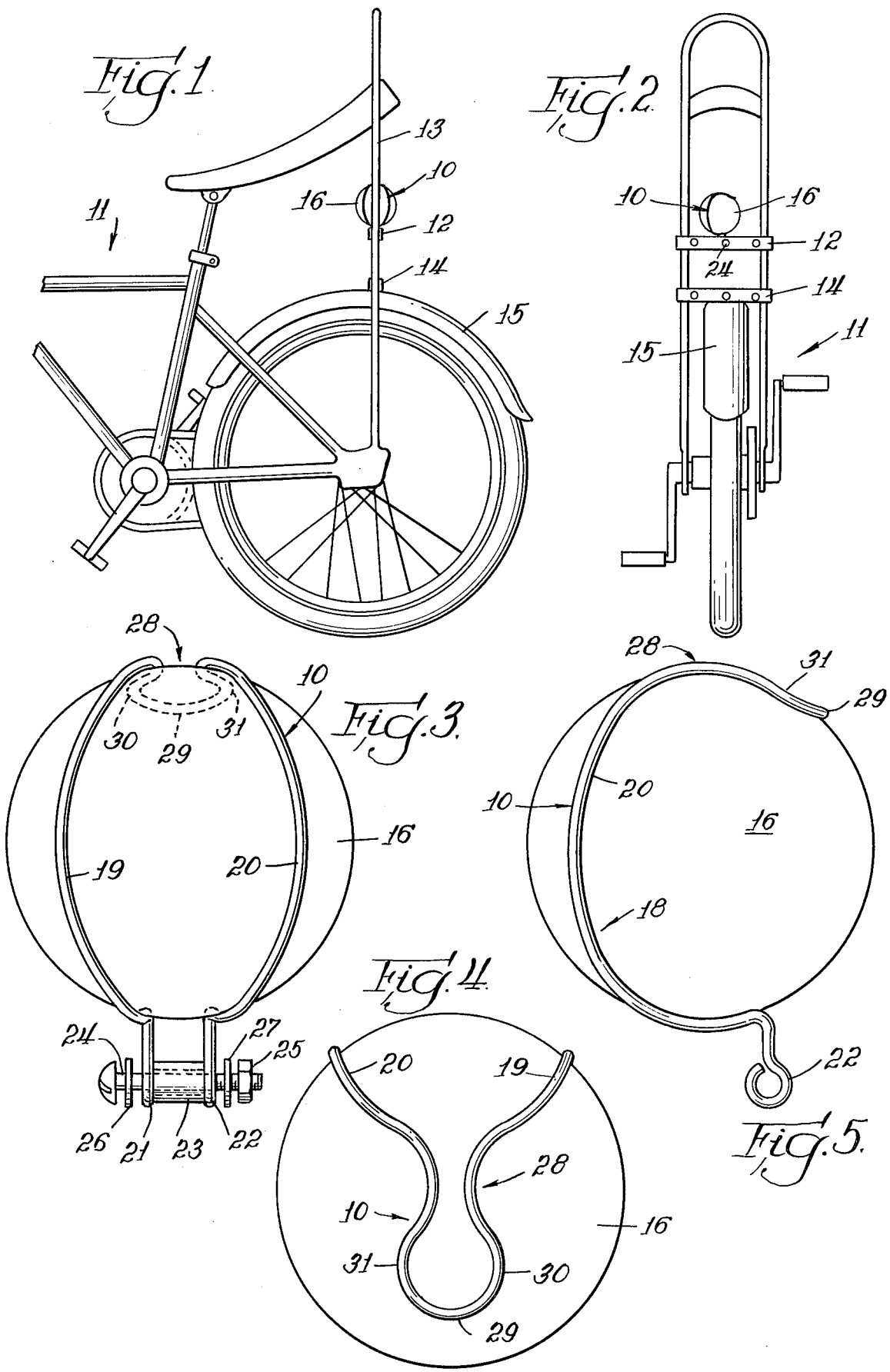

4,069,956

BALL CARRIER ADAPTED TO BE MOUNTED ON A BICYCLE

RELATED APPLICATION

This application is a continuation-in-part of copending Application U.S. Ser. No. 597,315, filed July 21, 1975, entitled "Bicycle-Mounted Baseball Bat and Ball Carrier".

BACKGROUND OF THE INVENTION

The present invention relates to ball carriers adapted to be mounted on bicycles and related vehicles, and more particularly refers to such carriers particularly adapted for supporting and removably retaining baseballs.

Baseball has become a favorite national sport and pastime for both young and old. It has become particularly popular among young people, witness the tremendous increase in the growing popularity of young people's baseball leagues such as Little League, Junior League, Pony League, etc. Because the playing fields are generally located at a considerable distance from the homes of the young players, the players almost invariably utilize bicycles for transportation to the playing field. As anyone who has ridden a bicycle knows, it is extremely difficult and even dangerous to ride a bicycle while trying to hold a baseball bat or baseball in one hand. For greatest safety, it is generally required that the bicycle rider use both hands to manipulate the bicycle. Riding while utilizing only one hand is extremely dangerous and is responsible for numerous accidents. Moreover, there is a real danger that the baseball bat or baseball may get caught in the wheel spokes, resulting in the rider's being thrown off the bicycle.

SUMMARY OF THE INVENTION

It is accordingly an object of the present invention to provide a device which may be mounted on the frame of a bicycle for carrying a ball such as a baseball.

It is still an additional object to provide a carrier device into which a baseball may be readily placed.

It is another object to provide a carrier device which prevents the baseball from interfering with the operation of the bicycle.

It is another object to provide a carrier mounted on the bicycle for holding a baseball securely, and for permitting instant removal therefrom.

It is still another object to provide carriers of the type described which are relatively simple to produce and relatively inexpensive.

Still other objects and advantages will readily present themselves to one skilled in the art upon reference to the ensuing specification, the drawings, and the claims.

BRIEF DESCRIPTION OF THE DRAWING

FIG. 1 is a fragmentary elevational view of a portion of a bicycle having a device according to the invention mounted on the bicycle and retaining a baseball.

FIG. 2 is a rear elevational view of the bicycle and the device shown in FIG. 1.

FIG. 3 is a side elevational view of the ball carrier of the invention shown with a ball retained therein.

FIG. 4 is a top view of the device shown in FIG. 3; and,

FIG. 5 is a rear elevational view of the device shown in FIG. 3.

DESCRIPTION OF THE PREFERRED EMBODIMENT

Referring to FIGS. 1 and 2, a ball carrier 10 is shown mounted on a bicycle 11 by means of a horizontal metal strap 12 affixed to a seat-supporting member 13. A second horizontal metal strap 14 is mounted on the seat-supporting member 13 for supporting a fender 15. A baseball 16 is shown mounted in the ball holder 10.

Referring to FIGS. 3-5, the ball holder 10 is shown in detail and comprises a single integral piece of wire bent to form a major wire loop 18 having a pair of arcuate members 19 and 20. The arcuate members must be sufficiently spaced apart to engage a portion of the ball therebetween, but must be spaced sufficiently close together at a distance less than the diameter of the ball so that the ball cannot pass therebetween. Eyes 21 and 22 are provided at the free ends of the arcuate members 19 and 20 for affixing the ball holder to the frame of a bicycle. As shown in FIG. 3, if desired, the mounting structure may also contain a spacer sleeve 23 positioned intermediate the eyes 21 and 22 and maintained in place by means of a bolt 24, a nut 25 and washers 26 and 27.

The arcuate members 19 and 20 converge to a constriction 28 at their other ends, which subsequently diverges to form a minor wire loop 29 comprised of arcuate members 30 and 31.

The ball carrier of the present invention may be formed from a single integral piece of wire by any commonly known method. It may be formed by bending by hand about a suitable a jig or even around a ball. The ball carrier is first formed into a Figure-8 structure, and then bent around a spherical structured jig or ball. The Figure-8 structure should be sufficiently long so that a portion of the ball greater than one-half the circumference is gripped. If desired, the structure may be further bent to provide a spring-loaded clamping force about the particular size of ball to be retained.

Although it is preferred that one portion of the Figure-8 structure have a greater diameter than that of the other, the two loops may, if desired, be made of the same diameter. However, the diameter of each loop should be smaller than the diameter of the ball.

The ball holder of the present invention has certain advantages over previously disclosed structures. It is relatively easy to insert a ball into the holder since this may be accomplished merely by pushing the ball into the jaws formed by the two loops. In other structures, it may be necessary to spread the clamping structure with one hand while the ball is inserted with the other. Because of the present structure in a form of jaws which may be constructed to provide a spring-loaded force retaining the ball, the ball is tenaciously gripped and maintained in place even when the structure and ball are subjected to dislodging forces resulting from being mounted on a bicycle traveling over a bumpy road. The structure of the invention has further advantages in that it is relatively simple to construct from readily obtainable wire, and construction and materials are therefore both quite inexpensive.

It is to be understood that the invention is not to be limited to the exact detail of operations or structures shown and described, as obvious modifications and equivalents will be apparent to one skilled in the art.

What is claimed is:

1. A ball carrier adapted to be mounted on a bicycle or other vehicle and to engage and retain a baseball therein and wherein the baseball may be readily disengaged therefrom, comprising a unitary wire-form structure generally in the form of a Figure-8 and comprising a first wire loop having a pair of arcuate members and having a distal portion and a proximal portion, and being of a diameter smaller than that of the ball to be engaged and terminating in free ends, the free ends of the arcuate members being provided with means for mounting on said bicycle, the proximal portion of said arcuate members converging to form a constriction, and a second wire loop having a proximal portion and a distal portion formed of arcuate members diverging from said constriction at the proximal portion of said second loop and being continuous with each other at the distal portion thereof, the plane of the Figure-8 structure being sufficiently bent to conform to the curvature of said ball and to retain said ball between the jaws defined by said first and second loops.

2. A ball carrier according to claim 1, wherein said means for affixing to a bicycle or other vehicle frame comprises a pair of integral eyes adapted to receive a bolt, one eye at the end of each arcuate member.

3. A ball carrier according to claim 2, wherein said first loop has a diameter greater than that of said second loop.

4. A ball carrier according to claim 2, wherein a tubular collar is disposed intermediate said eyes, and a bolt is disposed through said loops and said collar having an engaging nut threadedly mounted on the end thereof.

5. A ball holder according to claim 2, having a baseball in combination therewith disposed intermediate said first and second loops and being retained therebetween.

* * * * *